(12) United States Patent
Gajjar et al.

(10) Patent No.: US 11,893,127 B2
(45) Date of Patent: Feb. 6, 2024

(54) SYSTEM AND METHOD FOR INDEXING AND SEARCHING ENCRYPTED ARCHIVES

(71) Applicant: Acronis International GmbH, Schaffhausen (CH)

(72) Inventors: Hiten Gajjar, Singapore (SG); Dian Bakti, Singapore (SG); Prabhuraj Reddy, Singapore (SG); Stanislav Protasov, Moscow (RU); Serguei Beloussov, Costa del Sol (SG)

(73) Assignee: Acronis International GmbH, Schaffhausen (CH)

( * ) Notice: Subject to any disclaimer, the term of this patent is extended or adjusted under 35 U.S.C. 154(b) by 843 days.

(21) Appl. No.: 16/722,109

(22) Filed: Dec. 20, 2019

(65) Prior Publication Data

US 2020/0202034 A1  Jun. 25, 2020

Related U.S. Application Data

(60) Provisional application No. 62/783,567, filed on Dec. 21, 2018.

(51) Int. Cl.
*G06F 21/62* (2013.01)
*G06F 16/22* (2019.01)
(Continued)

(52) U.S. Cl.
CPC ...... *G06F 21/6227* (2013.01); *G06F 11/1446* (2013.01); *G06F 16/2228* (2019.01); *H04L 9/0869* (2013.01); *G06F 2201/80* (2013.01)

(58) Field of Classification Search
None
See application file for complete search history.

(56) References Cited

U.S. PATENT DOCUMENTS 6,021,399 A * 2/2000 Demers ................. G06Q 20/10
  705/41
8,345,876 B1 * 1/2013 Sinn ..................... H04L 9/0656
  380/255

(Continued)

OTHER PUBLICATIONS

Valient Gough; EncFS presentation; 2005; retrieved from the Internet https://sites.google.com/a/arg0.net/www/encfs; pp. 1-39, as printed. (Year: 2005).*

(Continued)

*Primary Examiner* — Michael W Chao
(74) *Attorney, Agent, or Firm* — ArentFox Schiff LLP; Michael Fainberg (57) ABSTRACT

Disclosed herein are systems and methods for indexing and searching an encrypted archive. In one exemplary aspect, a method comprises generating, by a hardware processor, an encrypted data archive based on a user backup performed using a backup plan with an encryption flag enabled and a user key; generating, by the hardware processor, an index key for the encrypted data archive; encrypting, by the hardware processor, the index key using the user key; storing, by the hardware processor, the index key in a secure data storage; creating and mounting, by the hardware processor, an encrypted file system folder for the encrypted data archive using the index key; decrypting, by the hardware processor, data in the encrypted data archive using the user key; and indexing, by the hardware processor, the decrypted data.

16 Claims, 8 Drawing Sheets

(51) Int. Cl.
H04L 9/08 (2006.01)
G06F 11/14 (2006.01)

(56) References Cited

U.S. PATENT DOCUMENTS

| | | | | |
|---|---|---|---|---|
| 8,346,748 B1* | 1/2013 | Nair | ................ | H04L 67/51 |
| | | | | 707/960 |
| 9,210,090 B1* | 12/2015 | Baldi | ............... | H04L 47/31 |
| 9,569,517 B1* | 2/2017 | Smola | ............... | G06F 16/27 |
| 9,805,075 B1* | 10/2017 | Bachu | ............... | G06F 11/1461 |
| 9,836,357 B1* | 12/2017 | Wilk | ............... | G06F 11/1464 |
| 9,910,999 B1* | 3/2018 | Yu | ............... | G06F 21/6254 |
| 10,922,273 B1* | 2/2021 | Hoang | ............... | G06F 16/313 |
| 11,436,095 B2* | 9/2022 | Fiducci | ............... | G06F 16/182 |
| 11,727,135 B2* | 8/2023 | Rozenberg | ............... | G06F 21/6227 |
| | | | | 726/27 |
| 11,748,319 B2* | 9/2023 | Bandopadhyay | ... | G06F 11/2094 |
| | | | | 714/4.11 |
| 2002/0174355 A1* | 11/2002 | Rajasekaran | ............... | G06F 16/10 |
| | | | | 707/E17.135 |
| 2003/0103459 A1* | 6/2003 | Connors | ............... | H04L 1/1877 |
| | | | | 370/235 |
| 2004/0003246 A1* | 1/2004 | Hopkins | ............... | H04L 9/0643 |
| | | | | 713/168 |
| 2005/0004924 A1* | 1/2005 | Baldwin | ............... | G06F 16/2246 |
| 2008/0028050 A1* | 1/2008 | Fiducci | ............... | H04L 63/105 |
| | | | | 709/220 |
| 2010/0169667 A1* | 7/2010 | Dewan | ............... | G06F 21/10 |
| | | | | 380/279 |
| 2011/0252243 A1* | 10/2011 | Brouwer | ............... | G06F 21/62 |
| | | | | 713/189 |
| 2014/0136807 A1* | 5/2014 | Brown | ............... | G06F 3/06 |
| | | | | 711/E12.092 |
| 2014/0369498 A1* | 12/2014 | Hammersmith | ...... | H04L 9/0656 |
| | | | | 380/46 |
| 2015/0033020 A1* | 1/2015 | Madden | ............... | H04L 9/0822 |
| | | | | 713/171 |
| 2015/0270958 A1* | 9/2015 | Jho | ............... | G06F 16/2228 |
| | | | | 380/28 |
| 2016/0299924 A1* | 10/2016 | Fujimoto | ............... | G06F 16/2455 |
| 2017/0103217 A1* | 4/2017 | Arasu | ............... | H04L 9/0819 |
| 2017/0155634 A1* | 6/2017 | Camenisch | ............... | H04L 9/085 |
| 2017/0277906 A1* | 9/2017 | Camenisch | ............... | G06F 16/2228 |
| 2018/0165470 A1* | 6/2018 | Nachenberg | ............... | H04L 9/0897 |
| 2019/0068558 A1* | 2/2019 | Jindal | ............... | H04L 63/205 |
| 2019/0080331 A1* | 3/2019 | Howald | ............... | H04L 9/006 |
| 2020/0119911 A1* | 4/2020 | Shemer | ............... | H04L 9/14 |
| 2021/0105138 A1* | 4/2021 | Tysor | ............... | H04L 9/0825 |

OTHER PUBLICATIONS

Till Brehm; How to encrypt your data with EncFS; 2016; retrieved from the Internet https://www.howtoforge.com/tutorial/encrypt-your-data-with-encfs-debian-jessie/; pp. 1-9, as printed. (Year: 2016).*

No stated author; gocryptfs—other projects; 2017; retrieved from the internet http://web.archive.org/web/20171011185549/https://nuetzlich.net/gocryptfs/comparison/; pp. 1-5, as printed. (Year: 2017).*

Schaad et al.; RFC 3537; 2003; retrieved from the Internet https://dl.acm.org/doi/pdf/10.17487/RFC3537; pp. 1-9, as printed. (Year: 2003).*

* cited by examiner

SYSTEM AND METHOD FOR INDEXING AND SEARCHING ENCRYPTED ARCHIVES

CROSS-REFERENCE TO RELATED APPLICATIONS

This application claims benefit of priority to U.S. Provisional Patent Application No. 62/783,567 filed on Dec. 21, 2018, which is herein incorporated by reference in its entirety.

FIELD OF TECHNOLOGY

The present disclosure relates generally to the field of accessing contents of archives, and more specifically, to systems and method for indexing and searching encrypted archives.

BACKGROUND

Often times encryption is used to secure file archives from unauthorized users and systems, and particularly to protect against malware or ransomware attacks. However, once the archives are encrypted, there may be a need to access particular files in the archive quickly, or to learn of the file's existence within the archive. Since the files are encrypted, the entire archive must be decrypted to access the file or even determine if the file is within the archive at all. Thus some methods have been proposed to index encrypted archives.

These conventional methods include encrypting the index data prior to storing in a search engine such as ElasticSearch, or the like. However, this method prohibits the use of more advanced search functionalities such as semantic search, linguistic search or cognitive search. Other methods include encrypting the index data for an archive at rest (e.g., stored on disk) using an encrypted file system. However, in this approach a common encryption key is used for encrypting each file system, even though various archives may be associated with different user keys.

Therefore there is a need to provide indexing for encrypted archives that allow for advanced search functionality such as semantic search, linguistic search or cognitive search while the encrypted archive index data is protected in some way with distinct user keys across all archives.

SUMMARY

Aspects of the disclosure describe systems and methods for indexing and searching an encrypted archive. In one exemplary aspect, a method comprises generating, by a hardware processor, an encrypted data archive based on a user backup performed using a backup plan with an encryption flag enabled and a user key, wherein the data archive that is encrypted using a user password; generating, by the hardware processor, an index key for the encrypted data archive; encrypting, by the hardware processor, the index key using the user key; storing, by the hardware processor, the index key in a secure data storage; creating and mounting, by the hardware processor, an encrypted file system folder for the encrypted data archive using the index key; decrypting, by the hardware processor, data in the encrypted data archive using the user key; and indexing, by the hardware processor, the decrypted data.

In some aspects, the user key is a first user key provided by a first user. Accordingly the method comprises identifying a second user key associated with a second user; generating another encrypted data archive based on another user backup and the second user key, wherein the another user backup is located in a same file system as the user backup; and encrypting another generated index key using the second user key.

In some aspects, the method for generating the index key comprises creating a string constant and a random key, wherein a combined length of the string constant and the random key is equal to a predetermined value; and concatenating the string constant and the random key.

In some aspects, the method for decrypting the data in the encrypted data archive further comprises: receiving a search request comprising an unverified user key; validating the unverified user key by decrypting the index key using the unverified user key; determining whether the index key comprises the string constant; in response to determining that the index key comprises the string constant, decrypting the encrypted data archive; or in response to determining that the index key does not comprise the string constant, not decrypting the encrypted data archive.

In some aspects, the method comprises adding a predefined prefix to the index key prior to encrypting the index key.

In some aspects, the method comprises using a cryptographic file system to store data at rest in encrypted format. In some aspects, the cryptographic file system is gocryptfs.

In some aspects, the encrypted file system is mounted in non-privileged mode.

In some aspects, the encrypted file system is mounted using file system in user space system.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for indexing and searching encrypted archives. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
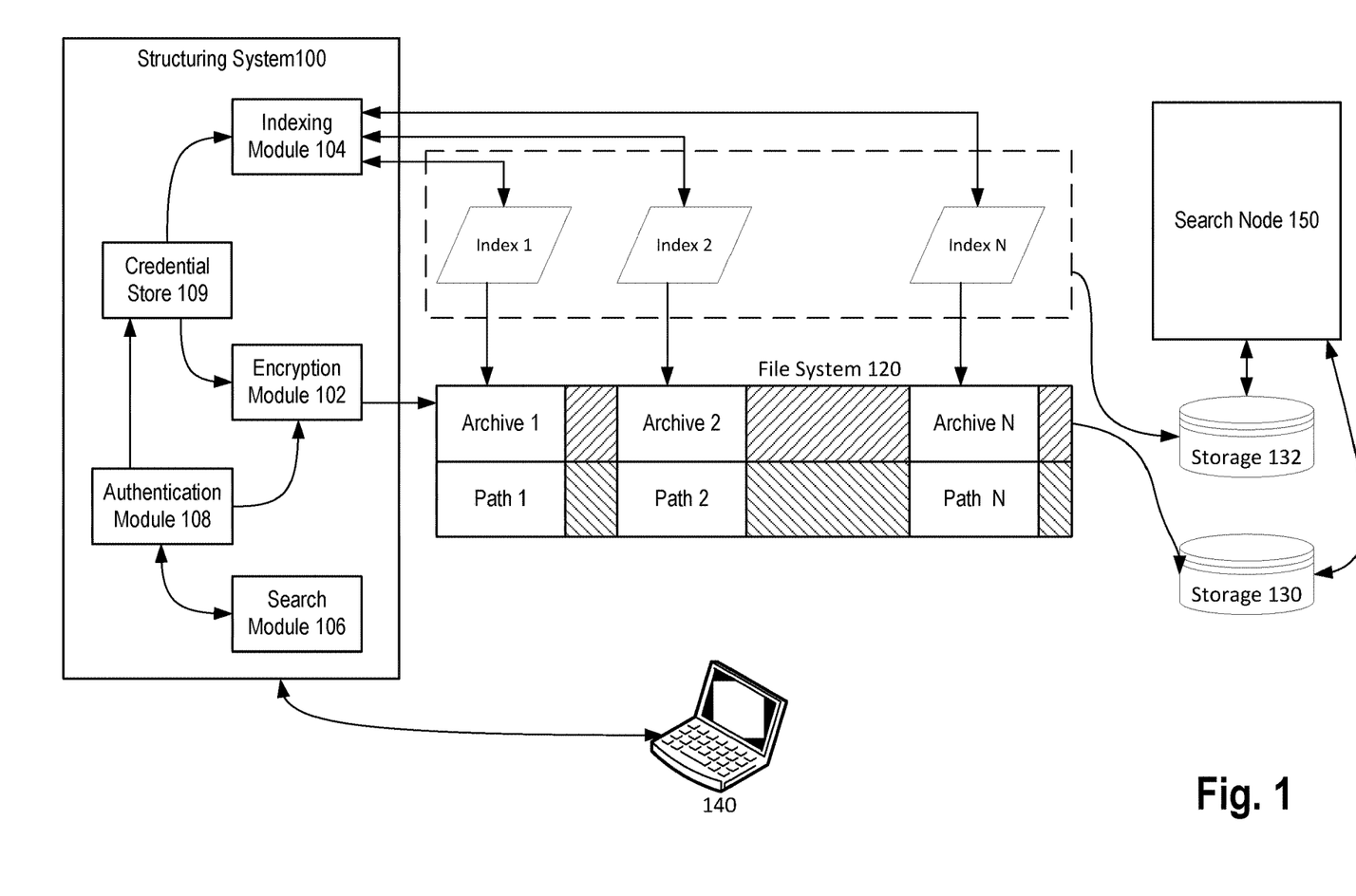
FIG. 1 is a block diagram illustrating a system for indexing and searching encrypted archives, in accordance with exemplary aspects of the present disclosure.

FIG. 1 is a block diagram illustrating a system 100 for indexing and searching encrypted archives, in accordance with exemplary aspects of the present disclosure.

In exemplary aspects, the system 100 performs indexing operations on encrypted archives, while allowing advanced search operations such as semantic searches, linguistic searches and cognitive searches by creating a special operating environment for an index/search module to operate on encrypted data in plain text while preserving the security of the data at rest. In exemplary aspects, an archive refers to any backup image (with or without multiple backup slice information).

The system 100 comprises an encryption module 102, an indexing module 104, a search module 106 (though in some aspects, the search module 106 may reside on a search node) and an authentication module 108. For example, the system 100 may perform indexing on data stored on file system 120 from storage 130 in a plurality of archives 1, 2 to N. Each of these archives 1 to N are associated with a corresponding index 1, 2 to N, each index corresponding to a unique path 1, 2 to N. The indices 1 to N may further be stored on storage, e.g., storage 132, though other configurations are also contemplated. Each of the archives 1 to N also have a corresponding unique user key, wherein each key may belong to a different user. In this aspect, index data (alternatively referred to as indices data) is stored on disk. Further, the mapping between indices and paths is a logical mapping. In exemplary aspects, there is a dedicated search index per archive and the dedicated search index may be stored in a unique folder on disk. The indexing module 104 and the search module 106 may write to a unique folder path for each index.

In some aspects, the system 100, and therefore the encryption module 102, may operate across storage devices and file systems, encrypting data on different devices. Thus at a granular level, the encryption module 102 may encrypt data on the file system 120 using a user key, distinct for each archive, from credential store 109 to generate archives 1, 2 to N, each archive corresponding to a particular path on the file system 120. The user key is provided by a user in a backup plan for backing up their data, and thus are stored in a secured manner for scheduled backups. The scheduled backup may be triggered to encrypt the source data and store the data in the encrypted archives on disk (at rest). In exemplary aspects, the credential store 109 stores both user keys and index keys in a secure data storage. The indexing module 104 may obtain unique index keys from credential store 109 to generate and encrypt each index 1, index 2 to index N, using distinct index keys. The index keys may be encrypted by the encryption module 102 and stored in storage until a user provides the same user key that was used to encrypt the index key. The search module 106 may receive search requests from a client 140 and search each archive using the indices 1 to N. The authentication module 108 may authenticate the client 140 and generate the index key used for generating the indices 1 to N.

In exemplary aspects, the encryption module 102 may be used to decrypt the encrypted archives 1 to N using a corresponding user key. The indexing module 104 then indexes the decrypted data and stores it on, for example, storage 132. Index key generation is discussed further below with respect to FIGS. 4-7. The indexing module 104 retrieves the index key from the credential store 109, validates the index key, opens the corresponding index, and mounts the indices for searching. The user key received in a search request is validated to ensure that the index key from the encrypted index key that is stored, is retrieved. A cryptographic file system (e.g., gocryptfs) on a search node 150 (e.g., ELASTICSEARCH, which may contain a search engine) mounts the data using the index key, and performs the search on the search node 150. The search results are transmitted back to the system 100, routed to the search module 106 which returns the results to the user or client 140. In exemplary aspects, the search request, returned results and other data flows to and from the various components of system 100 and search node 150 are performed using secure transport mechanisms such as HTTPS or the like.

In exemplary aspects, the authentication module 108 retrieves passwords and authentication in system 100. For example, the authentication module 108 generates new unique index keys applicable for each archive, used by the indexing module 104. Index key generation logic may comprise: using a string constant (referred to as match text) of any particular length (later used for validation), creating a random key, and concatenating these two along with a fixed length (for example) backup plan identification value.

The authentication module 108 also stores each index key and user key in credential store 109 and provides a password to the encryption module 102 to encrypt the index key. The authentication module 108 further provides the index key to the encrypted file system on search node 150 when a search is requested.

The search node 150 may, in some aspects, contain a UNIX/LINUX based file system, though other configurations are also contemplated. The search node 150 manages mounting and unmounting of the index folders that contain indexed data. The indexed data at rest will be encrypted using the index keys provided by the authentication module 108. In further aspects, the search node 150 may expose an application programming interface (API) to interface with external systems for mounting indexed file folders and passwords to use to decrypt data at rest, or to unmount indexed file folders. In some aspects, the search node may have ELASTICSEARCH installed on hardware, and the cryptographic file system (e.g., gocryptfs, or the like) is installed on the same hardware.

Figure 2:
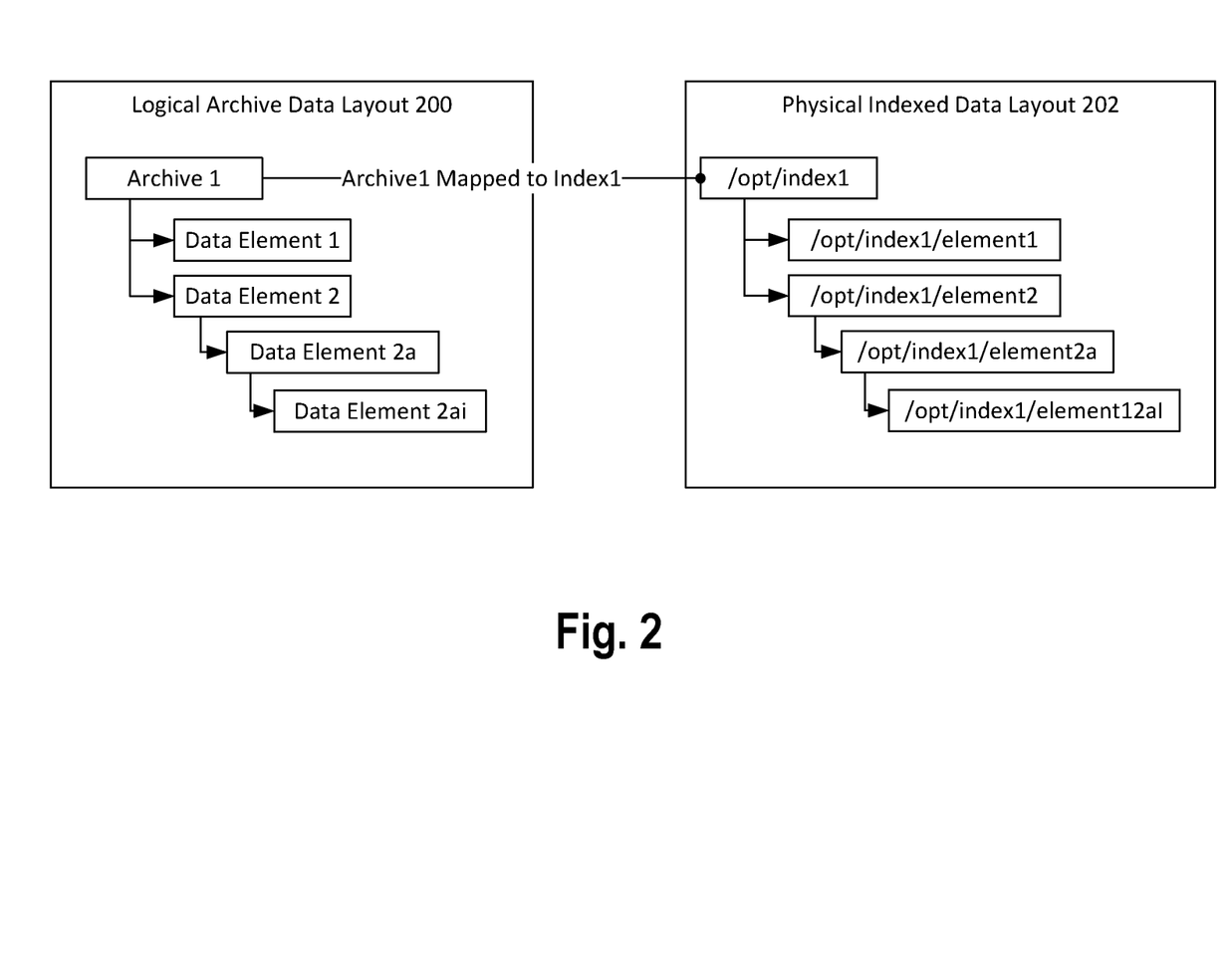
FIG. 2 is an illustration of the mapping between an archive and indices, in accordance with exemplary aspects of the present disclosure.

FIG. 2 is an illustration of the mapping between an archive and indices, in accordance with exemplary aspects of the present disclosure.

In an exemplary aspect, the archive may have a logical layout 200, comprising several subdirectories, e.g., data element 1 and data element 2. Data element 2 may have a further data element 2*a* as a sub-item. Data element 2*a* may have a further data element 2*ai* as a sub-element. This layout 200 is shown as an example of an archive layout, while an infinite number of alternate structures are contemplated depending on a user's categorizations. The layout 200 is mapped directly to the physical indexed data layout 202. Here, the top-level archive 1 is mapped to, for example, "/opt/index1". This top level "/opt/index1" contains further sub-elements that correspond to the data elements 1, 2, 2*a*, 2*ai*, namely: "/opt/index1/element1", "/opt/index1/element2", "/opt/index1/element2*a*" and "/opt/index1/element2*ai*".

In one aspect, each archive is indexed in a separate folder path, e.g. path 1, 2 to N on file system 120 shown in FIG. 1. In the search node 150, each archive is mapped to a single index. In this aspect, the assumption is that each archive is a part of a corresponding backup plan, each backup plan with a corresponding user key. At any point in time, each index holds data applicable to one archive only, or holds no data at all when no index folder is mounted. However, as illustrated in FIG. 2, all data elements from a single archive will be within the same folder structure.

Figure 3:
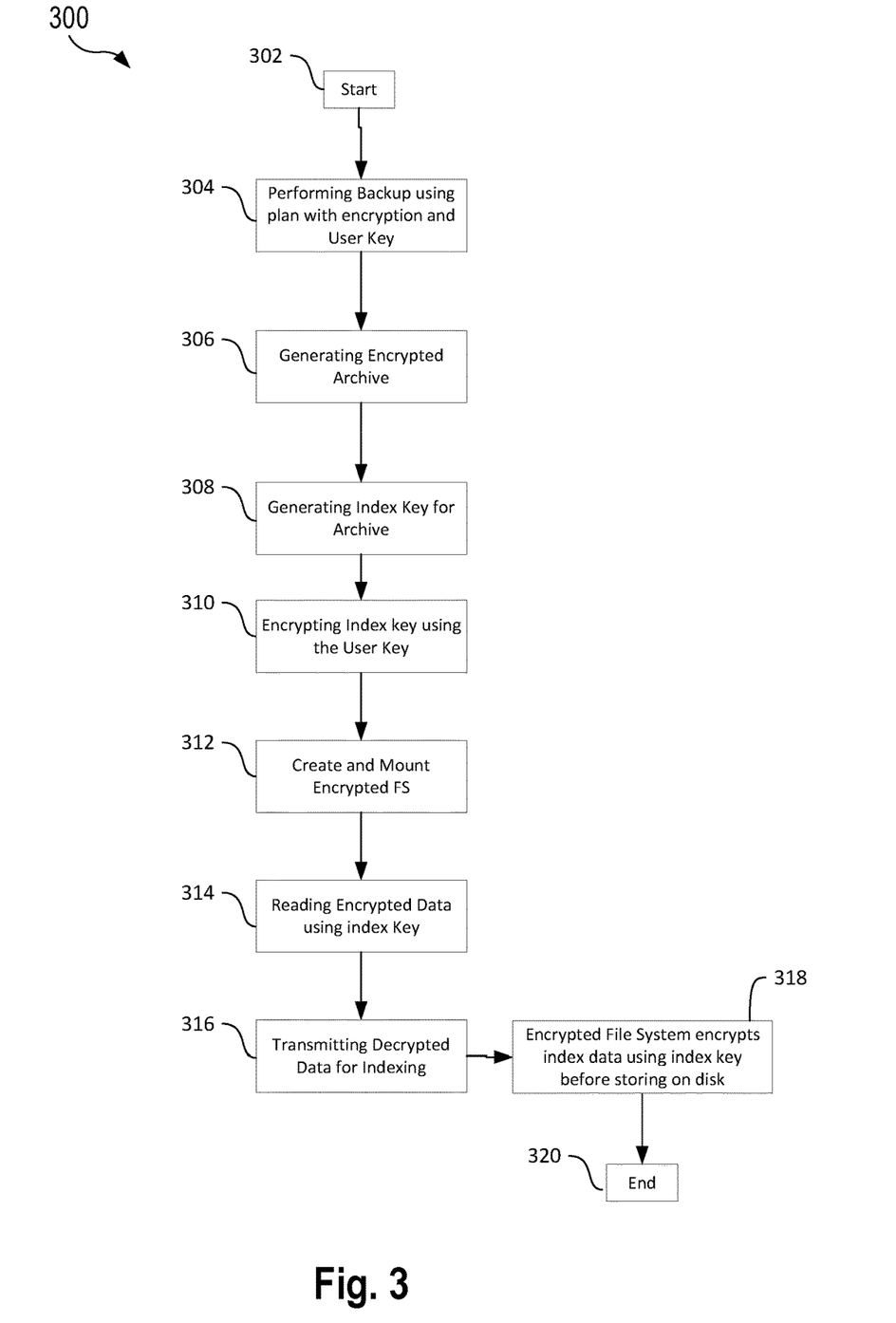
FIG. 3 is a flow diagram for a method for indexing encrypted archives, in accordance with exemplary aspects of the present disclosure.

FIG. 3 is a flow diagram for a method 300 for indexing encrypted archives, in accordance with exemplary aspects of the present disclosure.

The method 300 begins at 302 and proceeds to 304, where a backup is performed using a backup plan with encryption using a user key. At 306, the method 300 generates an encrypted archive based on the backed up data and the user key. As mentioned previously, the user key may be provided by a user in a backup plan for backing up their data. Encryption module 102 may utilize the user key to encrypt the backed up data and generate the encrypted archive.

At 308, authentication module 108 generates an index key for the archive. The generation process may, for example, involve using match text, a random key and a backup plan identifying value. The method subsequently advances to 310, where encryption module 102 encrypts the index key using the user key. At 312, a search node (e.g., search node 150) creates and mounts an encrypted file system. At 314, The encrypted file system is read/decrypted using the index key by the search node.

At 316, the decrypted data is transmitted for indexing at the search node. At 318, the encrypted file system encrypts index data using index key before storing on disk. The method ends at 320.

Figure 4:
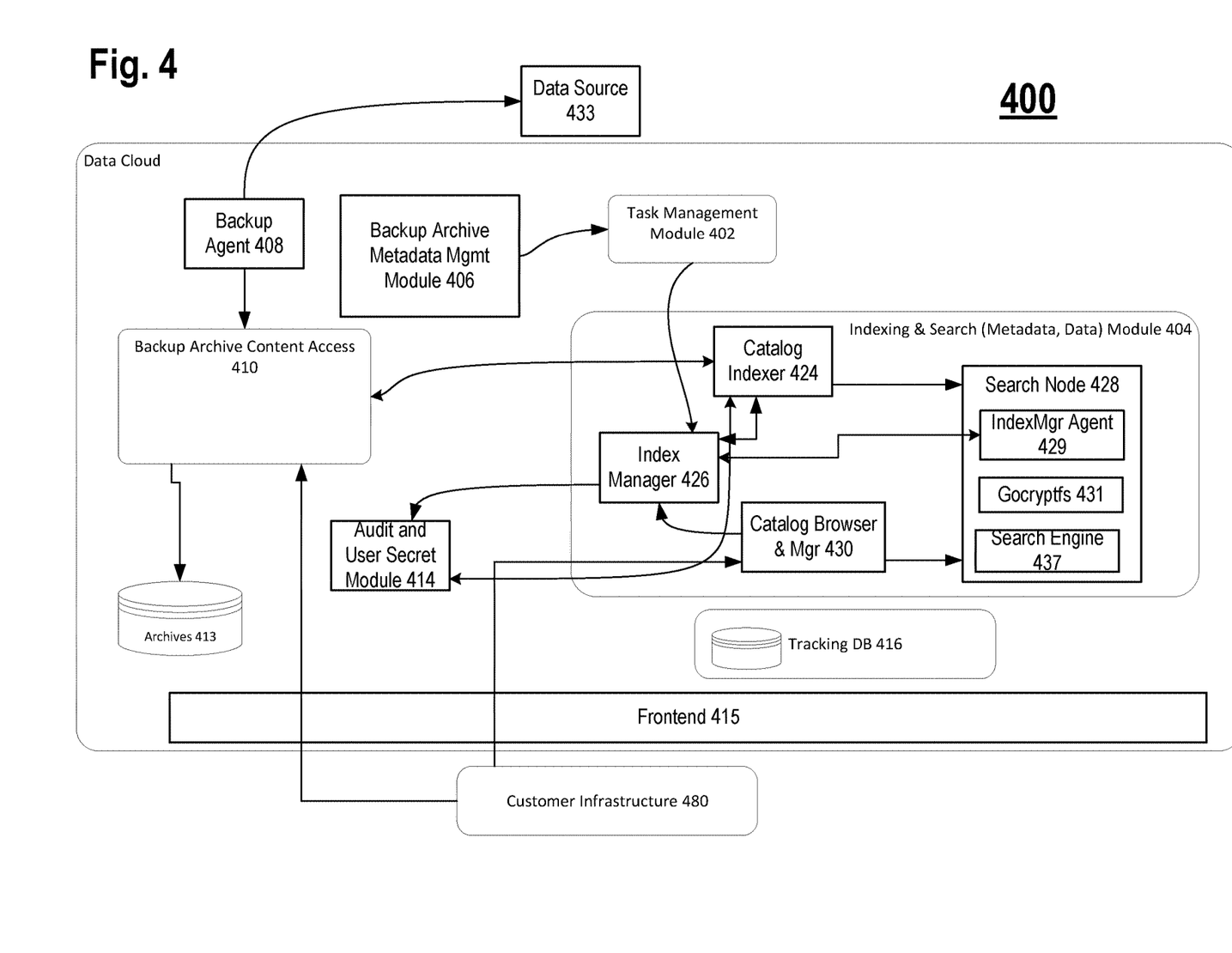
FIG. 4 is a block diagram illustrating an architecture of the system for indexing encrypted archives, in accordance with exemplary aspects of the present disclosure.

FIG. 4 is a block diagram illustrating an architecture 400 of the system for indexing encrypted archives, in accordance with exemplary aspects of the present disclosure.

In exemplary aspects, the architecture 400 includes a task management module 402, an indexing and search module 404, a backup archive metadata management module 406, backup agent 408, backup archive content access 410, storage access 412, archives 413, audit and user secret module 414 and tracking database 416. The tracking database 416 keeps track of which archives are indexed and on which search node (there may be multiple search nodes). In exemplary aspects, the tracking database may be a PERCONA database or the like. In exemplary aspects, each component communicates with other components securely, e.g., using secure sockets or the like.

The task management module 402 manages all the various tasks throughout the data cloud. The indexing & search module 404 is a metadata/data module that performs indexing on the stored archives using a catalog indexer 424, an index manager 426 and a search node 428. In some aspects, the catalog indexer 424 fetches an indexing task list from the task manager 420, obtains a search node instance from the index manager 426, and indexes unencrypted data over a secure layer such as SSL. The index manager 426 fetches tasks from the task manager 420, and opens, closes and deletes indices from the search node 428 via the index manager agent 429.

The catalog browser and manager 430 obtains search nodes from the index manager 426 when requested by the customer infrastructure 480 via a front-end 415 of the architecture 400. In exemplary aspects, the catalog browser and manager 430 receives a user key at the time of a search from the users and passes this key to the index manager 426. The index manager 426 retrieves the index key from audit and user secret module 414, and then decrypts this key to validate whether it has the "match text" discussed above. This validates whether the user key provided by the user is indeed the same as that used to encrypt the archive. In some aspects, the front-end 415 may be implemented using HAPROXY and/or NGINX or the like.

The search node 428 comprises an indexer agent 429, a cryptographic file system 431 such as gocryptfs, and a search engine 437. The indexer manager agent 429 mounts and unmounts the file system 431 using an index key obtained from the index manager 426, which receives index keys from the audit and user secret module 414 that securely stores credentials. The file system 431 can read and write in encrypted form to the encrypted archive. As discussed above, the file system 431 may mount multiple archives at different mount points, each with their own unique index key. In some instances, the search node 428 may be an ELASTICSEARCH node or the like.

The backup agent 408 may backup cloud data from a data source (e.g., cloud), though the system 400 maybe be applied to any archive with encrypted enabled using a user key. In some aspects, the cloud apps backup agent 408 may be an Office 365 or G-Suite backup agent, and the public cloud 433 may be a Google Cloud or MS cloud service. The backup agent(s) 408 backs up cloud data to the archives 413 using the backup archive content access module 410. In some aspects, the module 410 may comprise archive handlers that provide information to users at infrastructure 480.

Figure 5:
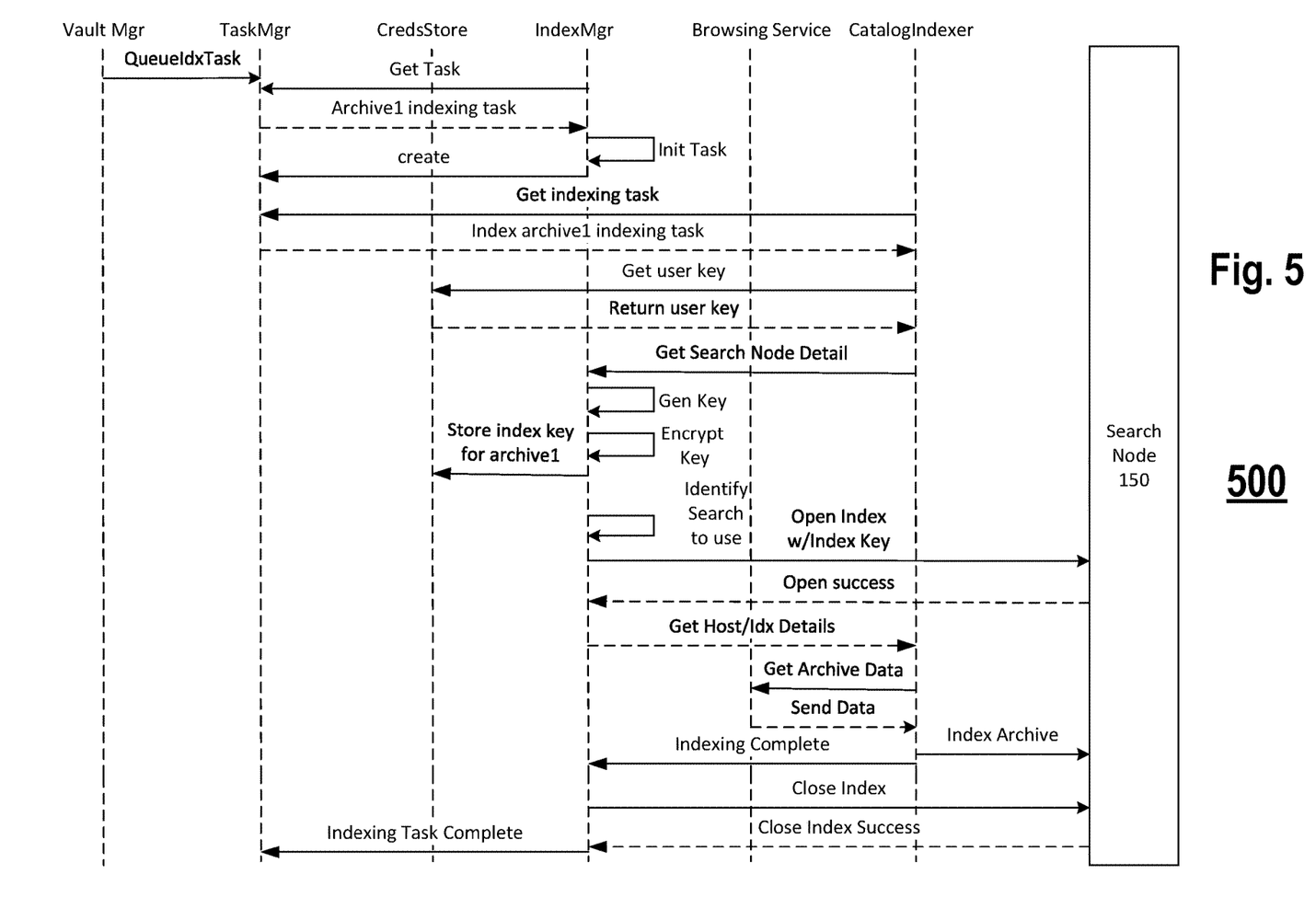
FIGS. 5-6 illustrate a sequence diagram for indexing, in accordance with exemplary aspects of the present disclosure.
Figure 6:
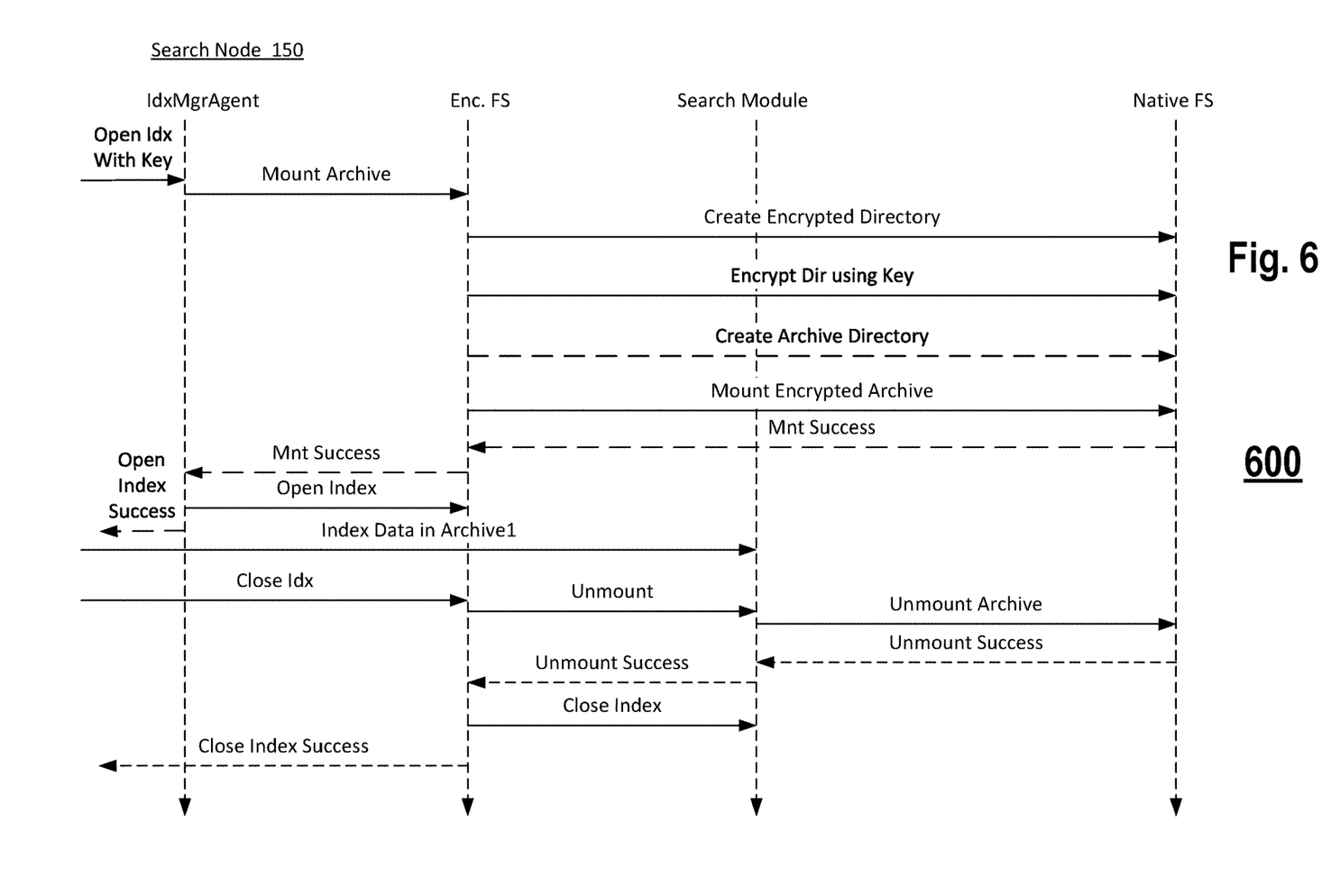

FIGS. 5-6 illustrate a sequence diagram 500 for indexing, in accordance with exemplary aspects of the present disclosure.

For the sake of brevity, the sequence diagram 500 does not show the archive backup procedure.

In an exemplary aspect, a vault manager (e.g. a component of the backup archive metadata management module 406) queues an indexing task for an archive with the task manager. Though in other aspects, any search may trigger an indexing of an archive, or the indexing may be scheduled. The Index Manager gets the index task from the task manager and initializes the task, returning the created task to the task Manager.

The cataloging indexer gets the indexing task from the task manager, and gets the user key for the archive from the credential store. The catalog indexer also obtains details about a search node to use for the archive and the given user key from the index manager. The index manager generates the index key, passes it to the index manager agent, and then encrypts the index key using the user key before storing the index key in the credential store. A search node is identified by the index manager to use for the archive, and an index is requested to be opened by the Index Manager Agent of the search node (shown in FIG. 6).

In the search node (e.g., search node 150), the index manager agent mounts the archive at a particular mount point, given the index key. The cryptographic file system creates an encrypted directory and encrypts the directory using the index key. The index manager agent optionally creates an archive directory (if not already created) for the archive before mounting the archive to the encrypted directory. On mount success, the index manager agent requests the encrypted file system to open the index, which is then sent back to the index manager.

The index manager sends search node(s) details to the catalog indexer which gets the archive data using the user key, and then requests the search node to index the data. Once the indexing is complete, the index manager requests that the index manager agent of the search node close the index.

The search node 150 unmounts the archive. The index manager agent asks Search Engine to close the index. Then, the index manager agent asking the file cryptographic system to unmount the archive, given a particular directory. The cryptographic file system unmounts the directory at the native file system level, and unmounting success is reported to encrypted file system. The encrypted file system requests that the search module close the index, which is reported back to the index manager. The index manager reports to the task manager that the indexing task is complete so that the task manager can report success to the user or administrator of the system.

Figure 7:
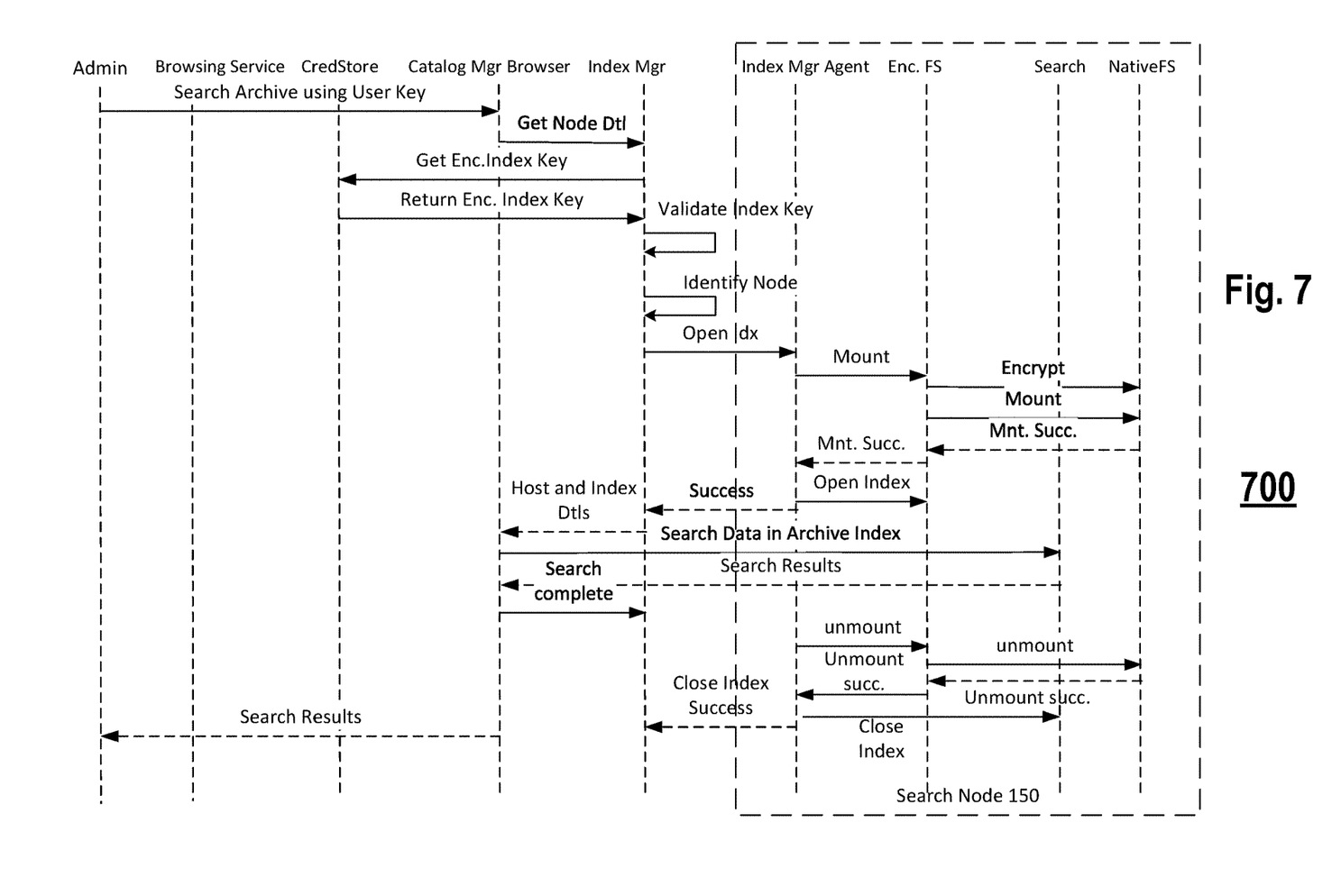
FIG. 7 is a sequence diagram for searching, in accordance with exemplary aspects of the present disclosure.

FIG. 7 illustrates a sequence diagram 700 for searching the encrypted archive, in accordance with exemplary aspects of the present disclosure.

According to exemplary aspects, the catalog manager browser receives a search request from a user along with a user key. The catalog manager browser obtains search node details from the index manager. The index manger obtains the encrypted index key for the archive from the credential store and validates the index key. In some aspects, validating the key comprises decrypting the encrypted index key using the user key, checking if a prefix of the key matches the match text, and then obtains the index key by removing the prefix. Based on the validated index key, a search node is identified to use for searching the archive.

The Index manager requests that the Index Manager Agent for the search node 150 opens the index for the archive using the index key. The index manager agent requests that the cryptographic file system mount the archive at a mount point. In this aspect, the cryptographic file system functions in non-privileged mode. The cryptographic file system encrypts the directory using the index key and mounts archive on the encrypted directory (e.g., using file-system in user space methods). In exemplary aspects, only the index and search module is able to read/write to the directory. In this aspect, such permissions are controlled by OS file and folder permissions (e.g., UNIX/LINUX, where a particular group only has access to the directory).

In order to mount and unmount index folders using the index, the Index Manager Agent (or Search Node Manager) and Index/Search Module should be configured to run in the same user context (e.g., LINUX user context), and it should be ensured that no other applications on the system are configured to execute as the same user. In further aspects, the cryptographic file system encrypts and decrypts the directory using an index key associated with only the archive being searched. The successful mount is reported back to the index manager agent. The index manager agent then requests that the encrypted file system open the index. Success is reported to the index manager, that reports the search node host and index details to the catalog manager browser. In some aspects, the search results may be paginated, so the unmount operation can/may be delayed.

The catalog browser manager then performs a search on the data in the archive by calling the search module of the search node 150 to retrieve results. Once the search is complete, the index manager closes the index and the search node unmounts the archive as described in FIGS. 5-6). The search results are returned by the catalog manager browser to the admin or user.

Figure 8:
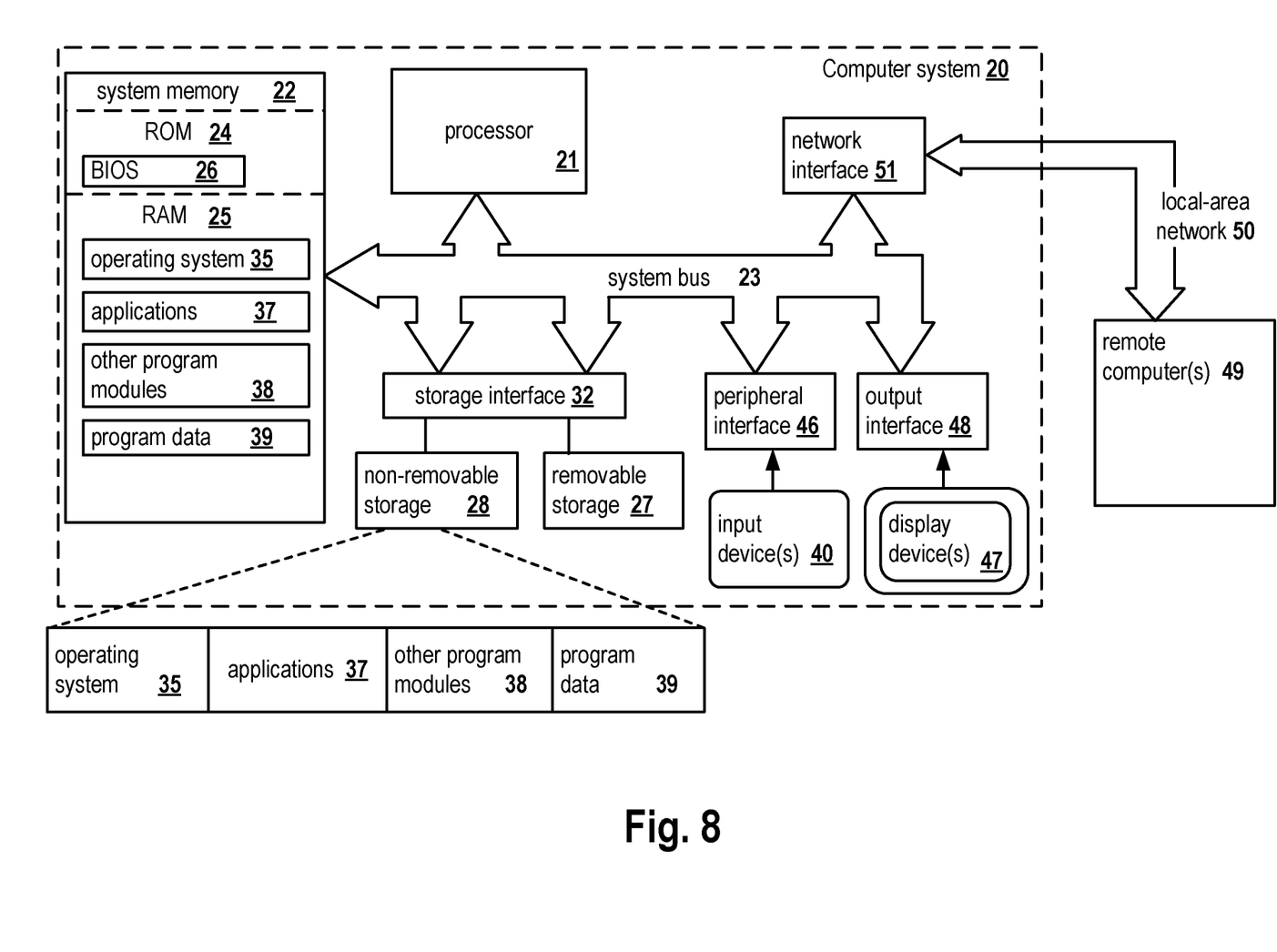
FIG. 8 is a block diagram of a computer system on which the disclosed system and method can be implemented according to an exemplary aspect.

FIG. 8 is a block diagram illustrating a computer system 20 on which aspects of systems and methods for indexing and searching an encrypted archive may be implemented in accordance with an exemplary aspect. It should be noted that the computer system 20 can correspond to the system 100 or 400 for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 8, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for indexing and searching an encrypted archive, the method comprising:
generating, by a hardware processor, an encrypted data archive based on a user backup performed using a backup plan with an encryption flag enabled and a user key;
generating, by the hardware processor, an index key for the encrypted data archive by:
creating a string constant and a random key, wherein a combined length of the string constant and the random key is equal to a predetermined value; and
concatenating the string constant, the random key and a backup plan identification value to form the index key;
encrypting, by the hardware processor, the index key using the user key;
storing, by the hardware processor, the index key in a secure data storage;
mounting, by the hardware processor, the encrypted data archive;
decrypting, by the hardware processor, data in the encrypted data archive using the user key;
generating an index of the encrypted data archive by indexing, by the hardware processor, the decrypted data;
encrypting, by the hardware processor, the index using the index key; and
receiving and executing a search request for the encrypted data archive by mounting, for searching, indices of the index decrypted using the index key in response to verifying that the search request includes the user key.

2. The method of claim 1, wherein the user key is a first user key provided by a first user, further comprising:
identifying a second user key associated with a second user;
generating another encrypted data archive based on another user backup and the second user key, wherein the another user backup is located in a same file system as the user backup; and
encrypting another generated index key using the second user key.

3. The method of claim 1, wherein executing the search request further comprises:
receiving the search request comprising an unverified user key;
validating the unverified user key by decrypting the index key using the unverified user key;
determining whether the index key comprises the string constant;
in response to determining that the index key comprises the string constant, decrypting the index; and
in response to determining that the index key does not comprise the string constant, not decrypting the index.

4. The method of claim 1 further comprising:
adding a predefined prefix to the index key prior to encrypting the index key.

5. The method of claim 1, further comprising using a cryptographic file system to store data at rest in encrypted format.

6. The method of claim 5, wherein the cryptographic file system is gocryptfs.

7. The method of claim 5, wherein the cryptographic file system functions in non-privileged mode.

8. A system for indexing and searching an encrypted archive, the system comprising:
a hardware processor configured to:
generate an encrypted data archive based on a user backup performed using a backup plan with an encryption flag enabled and a user key;
generate an index key for the encrypted data archive by:
creating a string constant and a random key, wherein a combined length of the string constant and the random key is equal to a predetermined value; and
concatenating the string constant, the random key and a backup plan identification value to form the index key;
encrypt the index key using the user key;
store the index key in a secure data storage;
mount the encrypted data archive;
decrypt data in the encrypted data archive using the user key;
generate an index of the encrypted data archive by indexing the decrypted data encrypt the index using the index key; and
receive and execute a search request for the encrypted data archive by mounting, for searching, indices of the index decrypted using the index key in response to verifying that the search request includes the user key.

9. The system of claim 8, wherein the user key is a first user key provided by a first user, wherein the hardware processor is further configured to:
identify a second user key associated with a second user;
generate another encrypted data archive based on another user backup and the second user key, wherein the another user backup is located in a same file system as the user backup; and
encrypt another generated index key using the second user key.

10. The system of claim 8, wherein the hardware processor is configured to execute the search request by:
receiving the search request comprising an unverified user key;
validating the unverified user key by decrypting the index key using the unverified user key;
determining whether the index key comprises the string constant;
in response to determining that the index key comprises the string constant, decrypting the index; and
in response to determining that the index key does not comprise the string constant, not decrypting the index.

11. The system of claim 8, wherein the hardware processor is configured to:
add a predefined prefix to the index key prior to encrypting the index key.

12. The system of claim 8, wherein the hardware processor uses a cryptographic file system to store data at rest in encrypted format.

13. The system of claim 12, wherein the cryptographic file system is gocryptfs.

14. The system of claim 12, wherein the cryptographic file system functions in non-privileged mode.

15. A non-transitory computer readable medium storing thereon computer executable instructions for indexing and searching an encrypted archive, comprising instructions for:
generating an encrypted data archive based on a user backup performed using a backup plan with an encryption flag enabled and a user key;
generating an index key for the encrypted data archive by:
creating a string constant and a random key, wherein a combined length of the string constant and the random key is equal to a predetermined value; and
concatenating the string constant, the random key and a backup plan identification value to form the index key;
encrypting the index key using the user key;
storing the index key in a secure data storage;
mounting the encrypted data archive;
decrypting data in the encrypted data archive using the user key;
generating an index of the encrypted data archive by indexing the decrypted data encrypting the index using the index key; and
receiving and executing a search request for the encrypted data archive by mounting, for searching, indices of the index decrypted using the index key in response to verifying that the search request includes the user key.

16. The non-transitory computer readable medium of claim 15, wherein the user key is a first user key provided by a first user, further comprising instructions for:
identifying a second user key associated with a second user;
generating another encrypted data archive based on another user backup and the second user key, wherein the another user backup is located in a same file system as the user backup; and
encrypting another generated index key using the second user key.

* * * * *